(12) United States Patent
Van Wageningen et al.

(10) Patent No.: US 10,897,154 B2
(45) Date of Patent: Jan. 19, 2021

(54) INDUCTIVE WIRELESS POWER TRANSFER WITH SYNCHRONIZED POWER MEASUREMENT

(71) Applicant: KONINKLIJKE PHILIPS N.V., Eindhoven (NL)

(72) Inventors: Andries Van Wageningen, Wijlre (NL); Antonius Adriaan Maria Staring, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 434 days.

(21) Appl. No.: 15/745,722

(22) PCT Filed: Jul. 14, 2016

(86) PCT No.: PCT/EP2016/066765
§ 371 (c)(1),
(2) Date: Jan. 18, 2018

(87) PCT Pub. No.: WO2017/012979
PCT Pub. Date: Jan. 26, 2017

(65) Prior Publication Data
US 2018/0219416 A1     Aug. 2, 2018

(30) Foreign Application Priority Data
Jul. 21, 2015   (EP) ..................................... 15177706

(51) Int. Cl.
*H02J 50/10*   (2016.01)
*H02J 50/40*   (2016.01)
(Continued)

(52) U.S. Cl.
CPC ............ *H02J 50/10* (2016.02); *H02J 7/0029* (2013.01); *H02J 7/025* (2013.01); *H02J 50/12* (2016.02);
(Continued)

(58) Field of Classification Search
CPC .......... H02J 50/10; H02J 7/0029; H02J 50/12; H02J 50/40; H02J 50/60; H02J 50/80; H02J 7/025; H02J 7/02
(Continued)

(56) References Cited

U.S. PATENT DOCUMENTS

2010/0181961 A1    7/2010  Novak et al.
2010/0248622 A1    9/2010  Lyell Kirby et al.
(Continued)

FOREIGN PATENT DOCUMENTS

WO    2009081115 A1    7/2009
WO    2012127335 A1    9/2012
WO    2014020464 A2    2/2014

*Primary Examiner* — Rexford N Barnie
*Assistant Examiner* — Thai H Tran

(57) ABSTRACT

An inductive wireless power transmitter is presented for transmitting an inductive wireless power signal to at least two inductive wireless power receivers. The power transmitter coordinates communication with the power receivers in time slots. It allocates a measurement time slot for synchronised power measurement by the power transmitter and the power receivers. During the measurement time slot the power transmitter measures the amount of power it transmits. After the end of the measurement time slot it receives from the power receivers the measured amounts of power received. From the measured power transmitted and power received, it determines an amount of power lost. If the amount of power lost exceeds a threshold value, it reduces the power of the inductive wireless power signal.

8 Claims, 7 Drawing Sheets

(51) Int. Cl.
*H02J 50/80* (2016.01)
*H02J 50/60* (2016.01)
*H02J 7/02* (2016.01)
*H02J 50/12* (2016.01)
*H02J 7/00* (2006.01)

(52) U.S. Cl.
CPC .............. *H02J 50/40* (2016.02); *H02J 50/60* (2016.02); *H02J 50/80* (2016.02)

(58) Field of Classification Search
USPC ........................................ 307/104; 320/108
See application file for complete search history.

(56) References Cited

U.S. PATENT DOCUMENTS

| | | |
|---|---|---|
| 2013/0307348 A1 | 11/2013 | Oettinger et al. |
| 2014/0191568 A1 | 7/2014 | Partovi |
| 2015/0054453 A1* | 2/2015 | White, II ................ H02J 7/007 320/108 |
| 2016/0141882 A1 | 5/2016 | Ichikawa |
| 2016/0181818 A1 | 6/2016 | Joye et al. |
| 2017/0207663 A1 | 7/2017 | Park et al. |

* cited by examiner

INDUCTIVE WIRELESS POWER TRANSFER WITH SYNCHRONIZED POWER MEASUREMENT

CROSS-REFERENCE TO PRIOR APPLICATIONS

This application is the U.S. National Phase application under 35 U.S.C. § 371 of International Application No. PCT/EP2016/066765, filed on 14 Jul. 2016, which claims the benefit of European Patent Application No. 15177706.7, filed on 21 Jul. 2015. These applications are hereby incorporated by reference herein.

FIELD OF THE INVENTION

The present invention relates to an inductive wireless power transmitter, an inductive wireless power receiver, and a method of determining power loss in an inductive wireless power transfer system.

BACKGROUND OF THE INVENTION

Inductive wireless power transfer is becoming increasingly popular. In this technology a power transmitter device generates a magnetic field using a primary coil. A power receiver device taps energy from this magnetic field using a secondary coil, inductively coupled to the primary coil by close proximity. Thus power is transferred without making electrical contact. One such technology is standardized in the Wireless Power Consortium, and is known under the name of Qi.

In an application example of this technology, a mobile phone acts as the power receiver and has a secondary coil built in. For charging of the phone's batteries, it is placed on the surface of a wireless charging pad that has a primary coil built in. The two coils are coupled by proper placement of the phone on the charging pad, and power is transferred from the charger to the phone wirelessly by induction. Thus the phone can be charged by simply placing it on a dedicated charger surface, without the need for attaching connectors and wires to the phone. The charging of a mobile phone or other portable device is a low-power application, with typically about 1 to 5 watt of power being transferred from transmitter to receiver. High-power applications of inductive wireless power transfer may be used for cooking food or even charging an electrical car wirelessly.

The Qi standard for inductive wireless power transfer specifies a communication interface for communication between a wireless power transmitter and a wireless power receiver. Such communication is needed a.o. to properly match the power transmission to the characteristics of the receiving device. This communication has been specified only for a single transmitter working with a single receiver. Only receiver-to-transmitter communication is supported, achieved by load modulation on the receiver side. The load modulation leads to modulation of the transmitted power, which can be detected on the transmitter side as modulation of the voltage or current in the primary coil. The single receiver communicates its power needs, and the transmitter obliges. This is described e.g. in WO2014020464.

When a metallic object is present in the proximity of the power transmitter, the magnetic field of the primary coil may induce eddy currents in the object that cause it to heat up. If the temperature of the object gets too high this may cause skin burns on contact. One method to avoid this is to detect such foreign objects by determining power losses, as described in WO 2012127335 and US 2013/0307348 A1. Both the power receiver and the power transmitter measure their power, and the receiver communicates its measured received power to the power transmitter. When the power transmitter detects a significant difference between the power sent by the transmitter and the power received by the receiver, then an unwanted foreign object may be present, and power transfer should be reduced or aborted for safety reasons.

The solutions described above work for a power transmitter and one power receiver only. A solution is needed for the detection of foreign objects in a situation where a single primary coil (or multiple primary coils operated in series or parallel) in a power transmitter is coupled to multiple secondary coils in multiple power receiver devices. This may arise for example in case of a larger charging pad that can accommodate several portable devices simultaneously, transferring power to multiple devices in parallel, such as described in US 2010/0181961 A1.

SUMMARY OF THE INVENTION

It is an object of the invention to provide an inductive wireless powering technology enabling the detection of foreign objects by a single inductive wireless power transmitter transferring power to multiple inductive wireless power receivers. The inventors have realized that multiple power receivers can each communicate with a single power transmitter using load modulation, but a power receiver will be unable to detect any communication from another receiver because the inductive coupling between the secondary coils of two receivers is far too weak. Furthermore the inventors have realized that because the communication between an inductive wireless power transmitter and multiple inductive wireless power receivers occurs by modulation of the power signal, such communication may interfere with any power measurements performed in the process for detecting foreign objects. Therefore a new approach is needed in which the communication between the single power transmitter and the multiple power receivers as well as the power measurements are coordinated by the transmitter, and organised in such a way that it enables reliable power measurements to be performed by the power transmitter as well as the power receivers.

This is achieved, according to a first aspect of the invention, by an inductive wireless power transmitter for transmitting an inductive wireless power signal with a power of at least 2 watt to at least two inductive wireless power receivers, comprising
  a primary coil for transmitting the inductive wireless power signal,
  a power converter for providing power to the primary coil,
  a power measurement unit for determining an amount of inductive wireless power transmitted by the power transmitter,
  a power modulation and demodulation unit for modulating and demodulating the inductive wireless power signal, and
  a communication coordination and control unit,
the communication coordination and control unit being arranged to control the power modulation and demodulation unit to coordinate communication with the at least two inductive wireless power receivers in time slots present in repeating communication frames, and the communication coordination and control unit being further arranged to:

allocate a power measurement time slot for synchronised power measurements, and announce the power measurement time slot to the wireless power receivers, activate the power measurement unit to determine the amount of inductive power transmitted by the power transmitter during the power measurement time slot, after the power measurement time slot receive from each of the wireless power receivers a message indicating an amount of inductive power received by that power receiver during the power measurement time slot, and from the determined amount of power transmitted and the amounts of power received, calculate an amount of power lost, wherein the inductive wireless power transmitter is further arranged to reduce the power of the inductive wireless power signal if the calculated amount of power lost exceeds a threshold value.

This power transmitter has the advantage that it can use the power loss method for establishing the presence of foreign objects in a system with multiple power receivers coupled to a single wireless power transmitter. Because communication and power measurement are fully coordinated and synchronised, the power measurements can be accurately performed by both power transmitter and power receivers. The power reduction when a power loss threshold is exceeded has the advantage that undue heating of foreign objects is prevented when the presence of such an object has been detected.

In a further embodiment, the duration of the power measurement time slot is in the range of 30 to 60 milliseconds. This offers the advantage of compatibility with older wireless power transmitters.

According to a second aspect of the invention, the object is achieved by an inductive wireless power receiver for receiving an inductive wireless power signal with a power of at least 2 watt from an inductive wireless power transmitter in a wireless power transfer system comprising at least one further inductive wireless power receiver, comprising a secondary coil for receiving the inductive wireless power signal, a power modulation and demodulation unit for modulating and demodulating the inductive wireless power signal, a power measurement unit for determining the amount of inductive wireless power received by the power receiver, and a communication and control unit, the communication and control unit being arranged to control the power modulation and demodulation unit to communicate with the inductive wireless power transmitter, in communication time slots present in repeating communication frames and which are coordinated by the inductive wireless power transmitter, and the communication and control unit being further arranged to:

receive from the inductive wireless power transmitter an announcement of an allocated power measurement time slot for synchronised power measurements, activate the power measurement unit to determine an amount of inductive power received by the power transmitter during the power measurement time slot, after the power measurement time slot send to the wireless power transmitter a message indicating the amount of inductive power received, for use by the wireless power transmitter in a detection of foreign objects based on a calculated amount of power lost in the wireless power transfer system.

This has the advantage that the power receiver cooperates with the wireless power transmitter to use the power loss method for establishing the presence of foreign objects in a system with multiple power receivers coupled to a single wireless power transmitter. Because communication and power measurement are fully coordinated and synchronised, the power measurements can be accurately performed by both power transmitter and power receivers.

According to a third aspect of the invention, the object is achieved by a method of detecting foreign objects by determining a power loss in an inductive wireless power transfer system comprising an inductive wireless power transmitter for transmitting an inductive wireless power signal with a power of at least 2 watt and at least two inductive wireless power receivers for receiving the inductive wireless power signal, wherein the power transmitter and the power receivers are arranged to communicate by means of modulation and demodulation of the inductive wireless power signal, where the communication is proportioned in time slots and coordinated by the power transmitter, the method comprising the steps of:

the power transmitter allocating a synchronised power measurement time slot and sending a message to the power receivers announcing the synchronised power measurement time slot, the power transmitter measuring during the power measurement time slot the inductive wireless power transmitted by the power transmitter, each of the power receivers measuring during the power measurement time slot an inductive wireless power received by that power receiver, each of the power receivers sending, after the power measurement time slot, a message to the power transmitter indicating the measured power received by that power receiver, the power transmitter calculating the power loss from the measured inductive wireless power transmitted by the power transmitter and the measured inductive wireless powers received by each of the power receivers, the power transmitter reducing the power of the inductive wireless power signal if the calculated power loss exceeds a threshold value.

This has the advantage that the power transmitter and the power receivers cooperate, under control of the power transmitter, to use the power loss method, enabling the detection of foreign objects. Because communication and power measurement are fully coordinated and synchronised, the power measurements can be accurately performed by both power transmitter and power receivers. The power reduction when a power loss threshold is exceeded has the advantage that undue heating of foreign objects is prevented when the presence of such an object has been detected.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept.

DETAILED DESCRIPTION OF EMBODIMENTS

The following description focuses mainly on embodiments of the invention applied in for example wirelessly charging the batteries of mobile phones, by way of example. However, it must be appreciated that the invention is not limited to that application only, but may be applied in many other devices such as smart watches, tablets, laptops, shavers, electrical toothbrushes, cooking or kitchen appliances, ranging in power transfer need from 1-5 watt for the smaller devices to 1000 watt or more for cooking and kitchen appliances.

Throughout the document, inductive wireless power transmitters and inductive wireless power receivers are also referred to as (wireless) power transmitter and (wireless) power receiver, or even as just transmitter and receiver.

Figure 1:
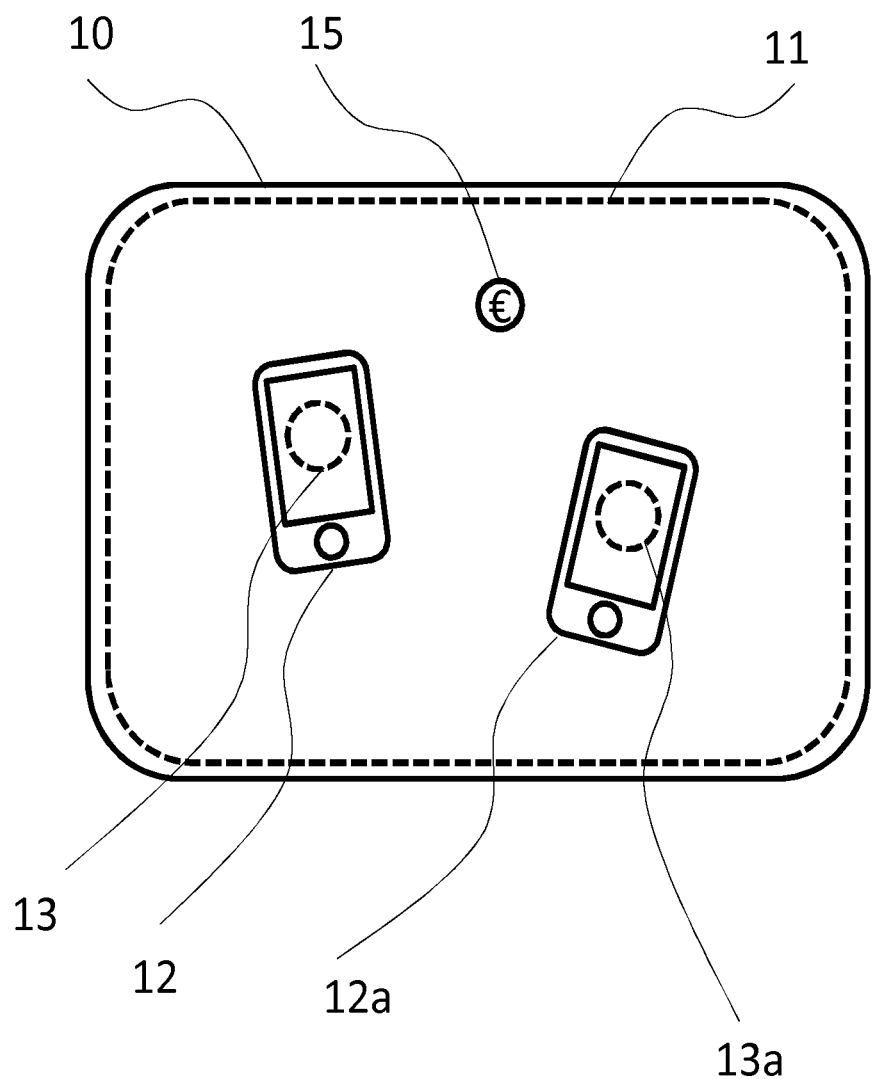
FIG. 1 illustrates a charge pad with two chargeable mobile devices.

FIG. 1 illustrates an example of a wireless power application. Two mobile devices 12 and 12a are placed on the surface of a wireless charging pad 10. This charging pad is just an example and may come in many forms, it may be a separate device or e.g. be part of a car dashboard, or built in to a work top surface or integrated in a piece of furniture. The charging pad in this example is equipped with a single primary coil 11, and acts as an inductive wireless power transmitter. The mobile devices are each equipped with a secondary coil, 13 and 13a respectively, and act as inductive wireless power receivers. The charging pad sends an alternating current through the primary coil, which causes an alternating magnetic field. This magnetic field in turn induces an alternating voltage and current in the two secondary coils, which may be rectified and used to charge the batteries of the mobile devices. Thus power is transferred from charger to mobile device wirelessly, as an inductive wireless power signal. The principle is similar to a traditional transformer, but with much weaker coupling, and the two coils now reside in separate devices.

Typically the amount of power to be transferred is around 1 to 5 watt for small mobile devices, depending on the application and on the requirements of the receiver. The power may be much higher for example in kitchen applications that may require 1000 watt or more. For A secondary coil in a wireless power receiver in these applications will typically be in a size range fitting a portable device, say 1 to 15 cm in diameter for devices ranging from smart watches to kitchen appliances. The primary coil may be about the same size, or may be larger in order to accommodate multiple receivers, as illustrated in FIG. 1. Instead of a single large primary coil, a number of smaller primary coils in series or in parallel may also be used, and these may be operated almost the same as a single coil.

In the example of FIG. 1, two mobile devices are being charged at the same time. It may well be that one device has other power requirements than the other, for example because one device is already fully charged while the other is not, or because one of the devices cannot handle a power level as high as the other device can. Both devices must be able to communicate their power needs to the charging pad. This can be achieved by modulation of the power transferred through load modulation on the receiver side: if a receiver varies the current through the secondary coil, for example by switching an additional load such as a resistor in series or parallel, this will lead to a modulation of the current through the primary coil as well, due to the mutual induction between primary and secondary coil. Thus the receiver can modulate the inductive wireless power signal. These modulations can readily be detected in the power transmitter, and in this way bit or byte coded messages can be transferred from power receiver to power transmitter. The mutual induction between the two secondary coils 13 and 13a of the two mobile devices, however, is very low due to their poor alignment, and therefore the two mobile devices cannot communicate with each other in the same way, in fact can they cannot even detect if another receiver device is communicating. It may therefore occur that the two devices attempt to communicate with the charging pad simultaneously, which leads to errors in reception of the communication and to both messages being lost. Simply trying again later is not an acceptable solution, as some of the data may be time critical. For example, a message that the power must immediately be switched off should not be delayed too much as that could potentially lead to damage.

In FIG. 1 a foreign object 15 is shown, placed on the surface of the charging pad. This could be any metallic object such as a coin or keys. The alternating magnetic field generated by the charging pad will induce eddy currents in the foreign metal object, which causes the object to heat up. This could lead to burns when the object is picked up, or it could lead to damage to the charging pad. Such foreign objects need to be detected, and upon detection the magnetic field needs to be reduced or switched off in order to prevent any damage. Alternatively, or additionally, an audible and/or visible alarm may attract the attention of a user and advise removal of the object.

Figure 2:
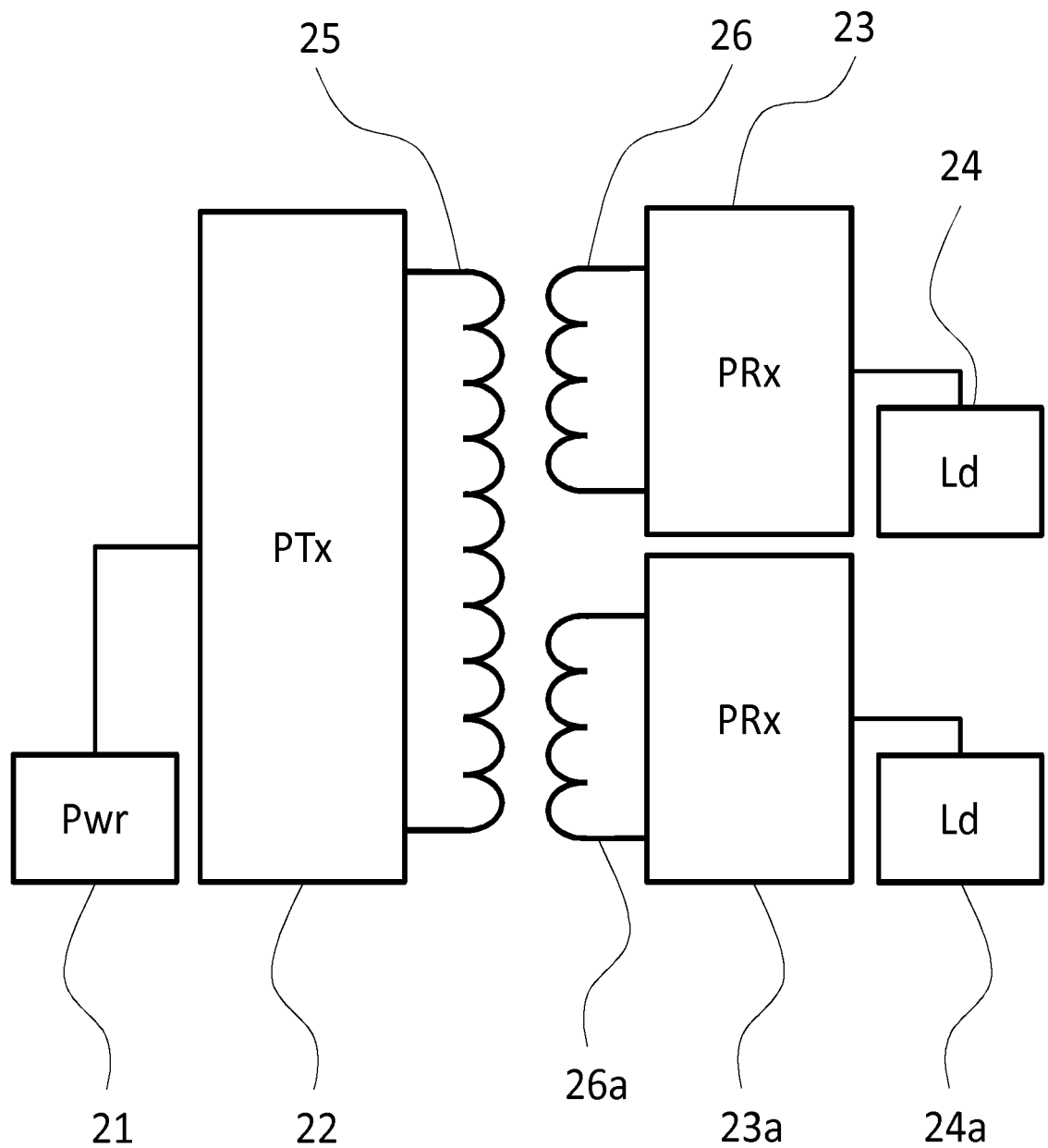
FIG. 2 illustrates a wireless power transmitter and two receivers.

FIG. 2 schematically illustrated a single inductive wireless power transmitter 22 (PTx) coupled to two inductive wireless power receivers 23 and 23a (PRx). The power transmitter comprises a primary coil 25, and obtains power from a power source 21, which may for example be the mains electricity. The two power receivers each comprise a secondary coil, 26 and 26a, and send the power they receive to a load, 24 and 24a. This load may for example be a battery that is to be charged, but many other options are possible, for example an electromotor may be powered, or a resistive element may be powered for heating purposes.

Figure 3:
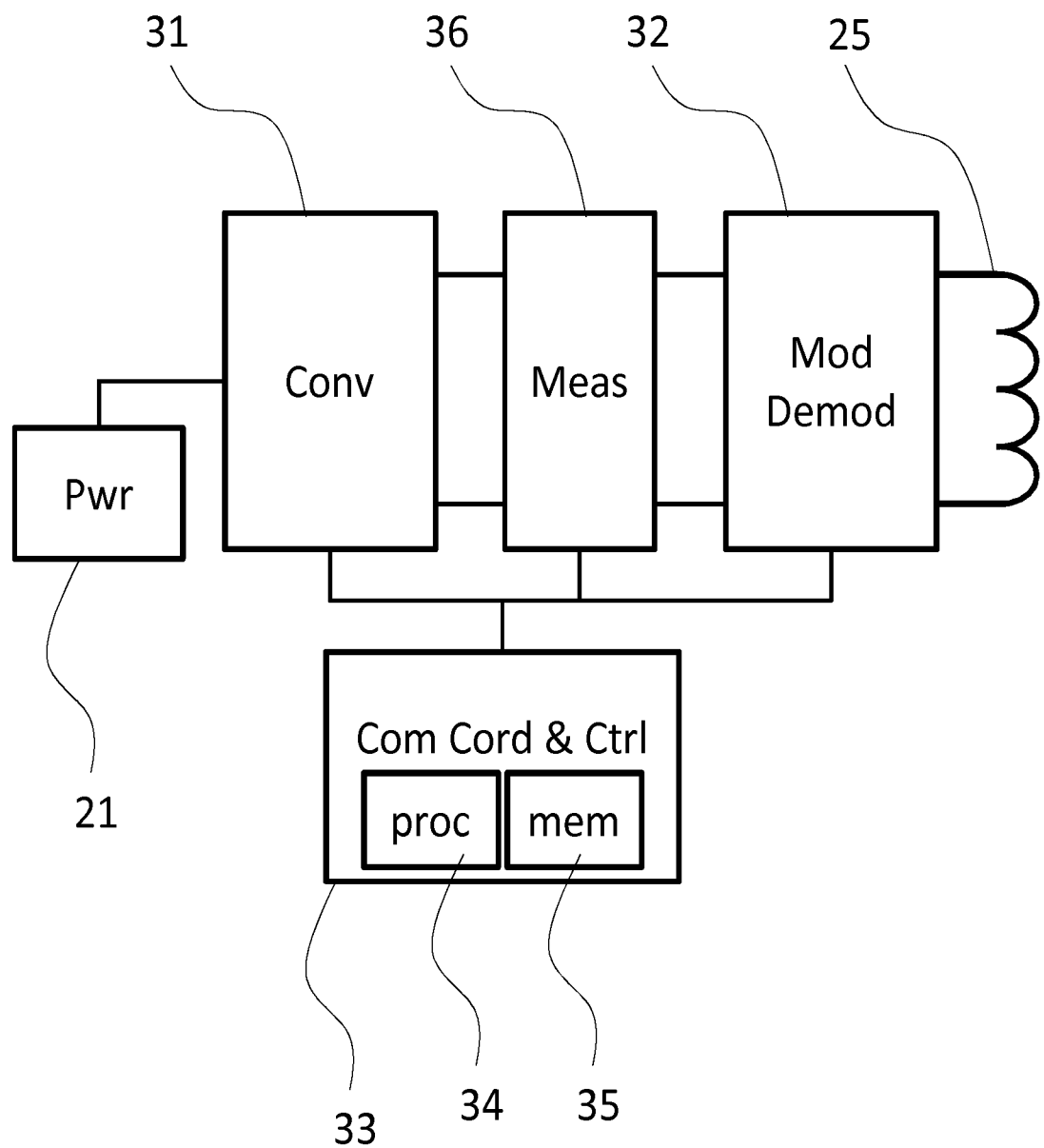
FIG. 3 illustrates a wireless power transmitter.

FIG. 3 schematically shows more detail of an inductive wireless power transmitter. The transmitter comprises a primary coil 25 for transferring an inductive wireless power signal to coupled inductive wireless power receivers, and an input for power coming from the power source 21. Additionally it comprises a power converter 31, a power modulation and demodulation unit 32, a communication coordination and control unit 33, and a power measurement unit 36.

The power converter 31 converts the input power received from the power source 21 into a power signal suitable for driving the primary coil. For example, it may convert an AC or DC input power to an AC power of a frequency suitable for inductive wireless power transfer. In Qi applications typically a frequency around 100 kHz is used.

The power modulation/demodulation unit 32 enables communication with coupled receivers by modulating and demodulating the inductive wireless power signal. When a receiver sends a communication message by modulating the current through its secondary coil as described above, the current through the primary coil in the transmitter will be modulated as well due to the inductive coupling of the coils. In this way, the inductive wireless power signal is modulated by the receiver. This can be detected by monitoring the current through the primary coil or the voltage across the primary coil in the modulation/demodulation unit 32. The voltage or current variations are demodulated and translated into bits and bytes and interpreted by the communication coordination and control unit 33.

To send a communication message in the form of a pattern of bits or bytes to a receiver, the modulation/demodulation unit 32 modulates the current through the primary coil, thereby modulating the inductive wireless power signal being transferred, which leads to a modulation in the current through the secondary coils as well due to the mutual induction. The modulation may be amplitude modulation, which may be achieved for example by switching a resistor in series or parallel to the primary coil. Alternatively frequency or phase modulation may be applied, where the frequency or phase of the AC current through the primary coil is modulated, which again can be detected in the receiver. For timing aspects of the communication, such as determining the duration of time slots and of the bytes and bits, and of the modulations representing the bits, the modulation/demodulation unit may comprise for example a time base generator or a reference clock. Alternatively this may for example also be comprised in the communication coordination and control unit 33.

The power measurement unit 36 measures the power generated by the inductive wireless power transmitter. This may be achieved by measuring both the voltage across the primary coil 25 and the current running through it. Alternatively, one of the two may be measured and a known relationship between the measured current or voltage and the actual power transferred by the power transmitter may be applied to determine the power. This known relationship may be established for example in the design and testing stages of the product.

The voltage and/or current measurement capability may be shared with the modulation and demodulation unit 32 where it is needed for demodulation purposes, or each unit may have its own separate facilities for current and/or voltage measurement.

The communication coordination and control unit 33 controls the power converter and coordinates the communication in conjunction with the modulation and demodulation unit 32. It sends and receives messages by controlling the modulation/demodulation unit and it controls the operation of the power transmitter. For example it may send a short inductive power pulse, a 'ping', to check if any receivers are present. If a receiver is present, it may respond with a message indicating its power needs. The communication and control unit, upon receiving this message may switch on power transmission continuously, controlling the power converter 31 to maintain the required power level. When the receiver no longer needs power, for example because a battery is fully charged, this again will be communicated by sending a message from receiver to transmitter, and the communication coordination and control unit 33 will, upon reception of this message, switch off the power transmission by controlling the power converter 31, at least if no other device still needs powering.

The communication coordination and control unit 33 further controls the measurement unit 36, activating it to perform power measurements when required and, after completion of the measurements, receiving from it the results of the power measurements.

The communication coordination and control units 33 may be implemented in many ways, including dedicated electronic circuits, field-programmable gate arrays, or as shown in FIG. 3 with a general purpose microprocessors 34 and a memory 35, configured or programmed to run the required methods and protocols for communication and control according to the invention.

Figure 4:
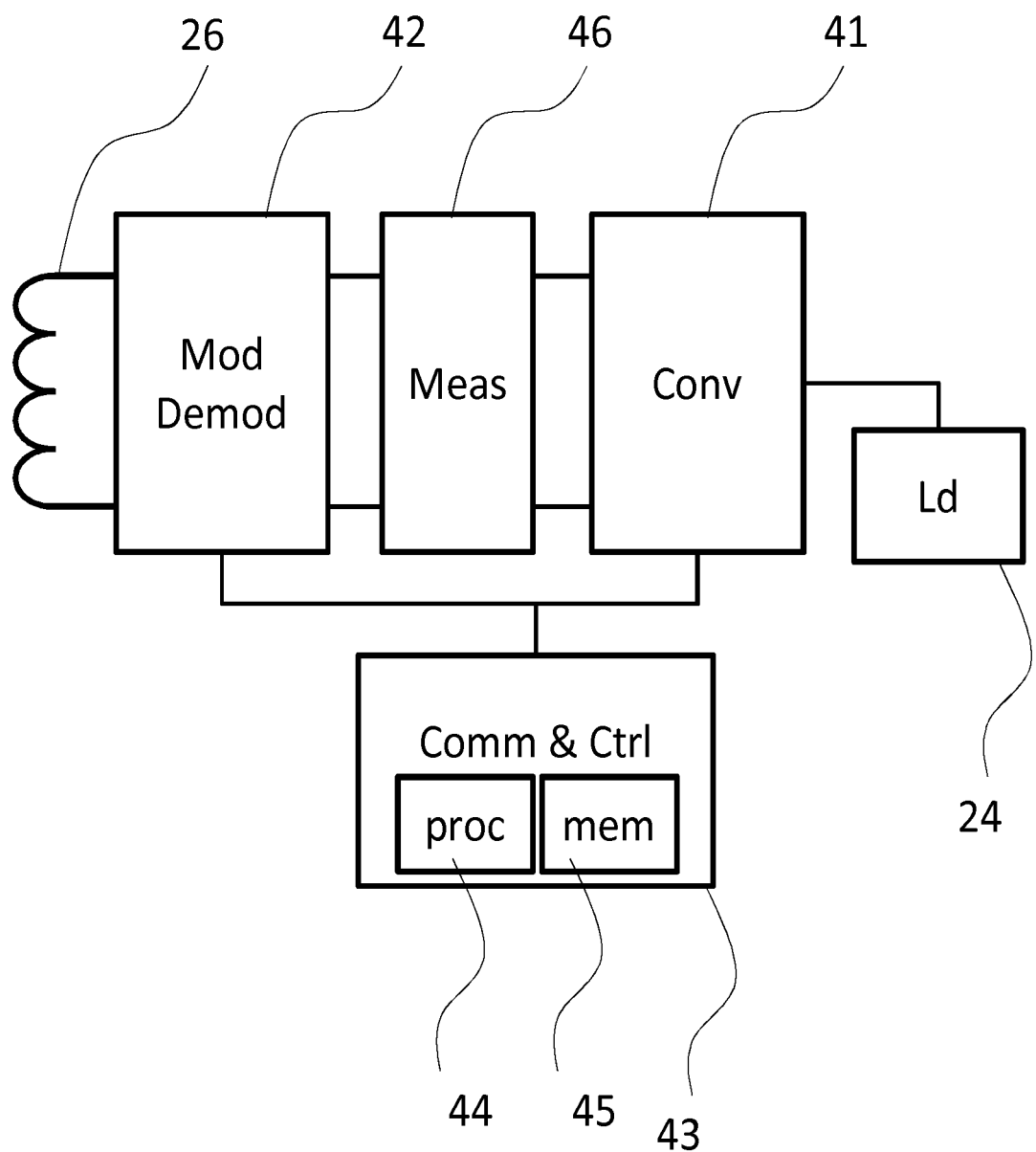
FIG. 4 illustrates a wireless power receiver.

FIG. 4 schematically shows more detail of an inductive wireless power receiver. The receiver comprises a secondary coil 26, and an output for the power to a load 24. Additionally it comprises a power converter 41, a power modulation and demodulation unit 42, a communication and control unit 43, and a power measurement unit 46. The power converter 41 converts the AC inductive power signal received by the secondary coil into an output power suitable for driving the load. For example, it may convert the received power signal to an AC or DC power suitable for the load.

The power modulation/demodulation unit 42 enables communication with a coupled power transmitter. It can modulate the inductive wireless power signal by load modulation as described above. When a transmitter sends a communication message by modulating the amplitude of the inductive wireless power signal as described above, the current through the secondary 26 coil in the receiver will be modulated in amplitude as well. This can be detected by monitoring the current through the secondary coil or the voltage across the secondary coil in the modulation/demodulation unit 42. The voltage or current variations are translated into bits and bytes and interpreted by the communication and control unit 43. In case the power transmitter uses frequency modulation of the power signal for communication, then the current through the secondary coil in the receiver will be frequency modulated as well. This can be detected by monitoring the frequency, for example by detecting zero-transitions of the current in the secondary coil, or of the voltage across the secondary coil, and measuring the duration of one or more cycles. For timing in the communication, such as determining the duration of the bits, and of the modulations representing the bits, the modulation/demodulation unit may comprise for example a time base generator or a reference clock. Alternatively this may for example also be comprised in the communication and control unit 43.

The power measurement unit 46 measures the power received by the inductive wireless power receiver. This may be achieved by measuring both the voltage across the secondary coil 26 and the current running through it. Alternatively, one of the two may be measured and a known relationship between the measured current or voltage and the actual power may be applied to determine the power. This known relationship may be established for example in the design and testing stages of the product.

The voltage and/or current measurement capability may be shared with the modulation and demodulation unit 42 where it is needed for demodulation purposes, or each unit may have its own separate facilities for current and/or voltage measurement.

The communication and control unit 43 controls the power converter and handles the communication in conjunction with the modulation/demodulation unit. It sends and receives messages by controlling the modulation/demodulation unit, and it controls the operation of the power receiver. For example it may detect a short inductive power pulse, a 'ping', sent by a power transmitter to check if any receivers are present. It may then respond with a message indicating its power needs. When subsequently the power transmitter switches on power transmission continuously, the communication and control unit 43 engages the power converter 41 to properly feed the wirelessly received power to the load 24. When the load no longer needs power, for example because a battery is fully charged, the communication and control unit in the power receiver may send a message to the transmitter to indicate no more power is needed, and disengage the power converter.

The communication and control unit 43 further controls the measurement unit 46, activating it to perform power measurements when required and, after completion of the measurements, receiving from it the results of the power measurements.

The communication and control units 43 may be implemented in many ways, including dedicated electronic circuits, field-programmable gate arrays, or as shown in FIG. 4 with a general purpose microprocessors 44 and a memory 45, configured or programmed to run the required methods and protocols for communication and control according to the invention.

Figure 5:
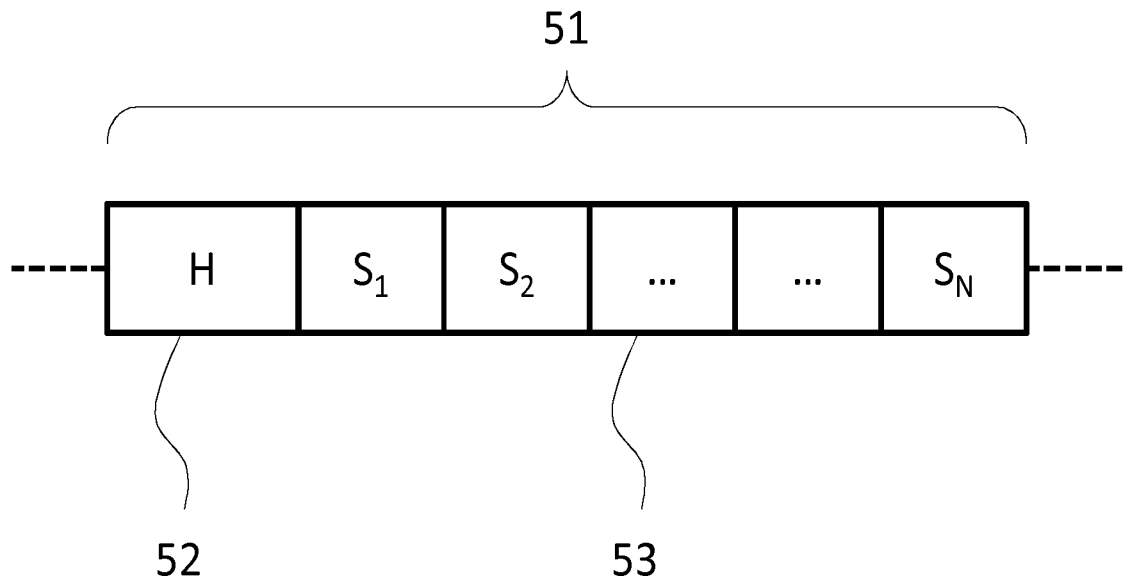
FIG. 5 illustrates a communication frame comprising time slots.

Due to the very weak inductive coupling between the secondary coils of two wireless power receivers placed on a charging pad, direct communication between two power receivers is not feasible. Even just detecting in one power receiver that another receiver is communicating is in practice impossible. Therefore the communication between the wireless power transmitter and one or more wireless power receivers must be organized and coordinated by the power transmitter, which communicates with each of the power receivers. This can be done by communicating in repeating communication frames as is illustrated in FIG. 5. A communication frame 51 comprises a frame header 52, labelled H, and multiple time slots 53, labelled $S_1$-$S_N$. During the frame header H the wireless power transmitter sends messages in the form of a number of bits present in the header slot. Thus the power transmitter initiates every frame and so coordinates the timing of the frames and of the slots in a frame. The number of time slots N may be chosen equal to the number of wireless power receivers present, or for example equal to the maximum number or wireless power receivers that can be supported by the wireless power transmitter. The number of time slots may be fixed and pre-agreed, or it may be variable and for example be announced in the frame header by the power transmitter coordinating the communication. The allocation of a particular time slot to a particular receiver may be done by the transmitter, which coordinates the communication. It may for example occur during a handshake procedure when the power receiver is placed on the charging pad and first communicates with the wireless power transmitter.

In some embodiments the structure of the communication frame may be different or more complex. For example, each communication time slot $S_1$-$S_N$ in which a power receiver can communicate may be preceded by a synchronization time slot in which the power transmitter can communicate. This may for example enable the power transmitter to communicate more timely in regard to the preceding or subsequent time slot. In this way the power transmitter more rigidly controls and coordinates the timing of the communication.

The inventors have realized that in order to enable foreign object detection using the power loss method, reliable measurement of the power sent by the power transmitter and power received by each of the power receivers present is necessary. It is impossible for the power transmitter to determine the amount of power it sends to each of the power receivers separately, so the power loss determination must be based on the total amount of power transmitted and the sum of the amounts of power received by each of the power receivers present.

Unfortunately the communication between the power transmitter and the power receivers interferes with the power measurement, as the communication is based on modulation of the power being transferred, both by the receivers and by the transmitter. Furthermore, the power measurements by the devices need to be synchronised, to avoid that variations in the power over time lead to an incorrect determination of power loss and thus a false detection of foreign objects. The power can vary over time, for example due to changes in the load of one of the power receivers as a battery charges.

Figure 6:
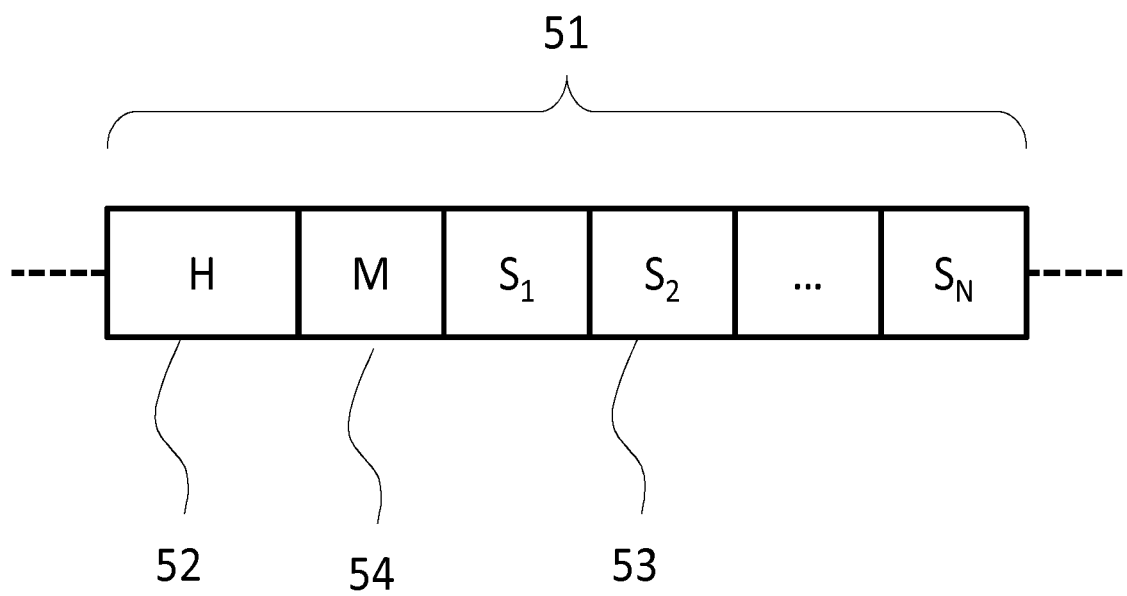
FIG. 6 illustrates a communication frame comprising a measurement slot.

FIG. 6 illustrates a modified communication frame. In addition to the frame header H and the communication time slots $S_1$-$S_N$, an additional power measurement time slot 54, labelled M, is now allocated by the power transmitter's communication coordination and control unit. During this power measurement time slot all units will perform a power measurement, and there will be no communication. During subsequent communication time slots, in the same frame or in one of the next few frames, each of the power receivers communicates the result of its power measurement to the power transmitter. The measured values may include correction factors, for example to correct for known losses inside the devices due to metal parts in the devices, or due to dissipation in the electronic circuitry etcetera. It may be agreed that all devices measure the power averaged or integrated over the duration of the power measurement time slot. This duration of the power measurement time slot can be predetermined.

The power transmitter then calculates the power loss from the difference between the power sent and the sum of the powers received. The calculation may not be highly accurate, but will at least be a sufficiently accurate approximation of lost power. If the power loss exceeds a certain predetermined threshold, foreign objects are apparently present and are absorbing too much energy, and consequently the power transfer may need to be discontinued or reduced, or some form of alarm may be activated to alert the user. The threshold value may be chosen based on experimental determination of safe limits. For example a very small loss of 1 mW will not lead to dangerous situations, in practice a threshold for example in the range of 100 mW to 2 W could be used. In high-power applications, for example in cooking appliances, the threshold may be chosen even somewhat higher.

The power measurement time slot M may be allocated by the power transmitter in all communication frames, and is then implicitly announced in the header at the start of each frame. Its position and duration within the communication frame may be fixed, for example always following the frame header as shown in FIG. 6, with an agreed duration. In that case the header serves as an implicit announcement of the start of the power measurement time slot.

Alternatively a power measurement time slot may be allocated in some communication frames only, in which case the presence or absence of a power measurement time slot in a frame may be announced by the wireless power transmitter in the frame header, for example by setting a predetermined flag or a bit value accordingly. In practice is may be sufficient to repeat the power measurement for foreign object detection regularly, with an interval of for example 1 to 5 seconds. The position and length of the power measurement time slot within a frame may also be variable, in which case information is communicated by the power transmitter in the frame header to announce the start and end of the power measurement time slot.

Figure 7:
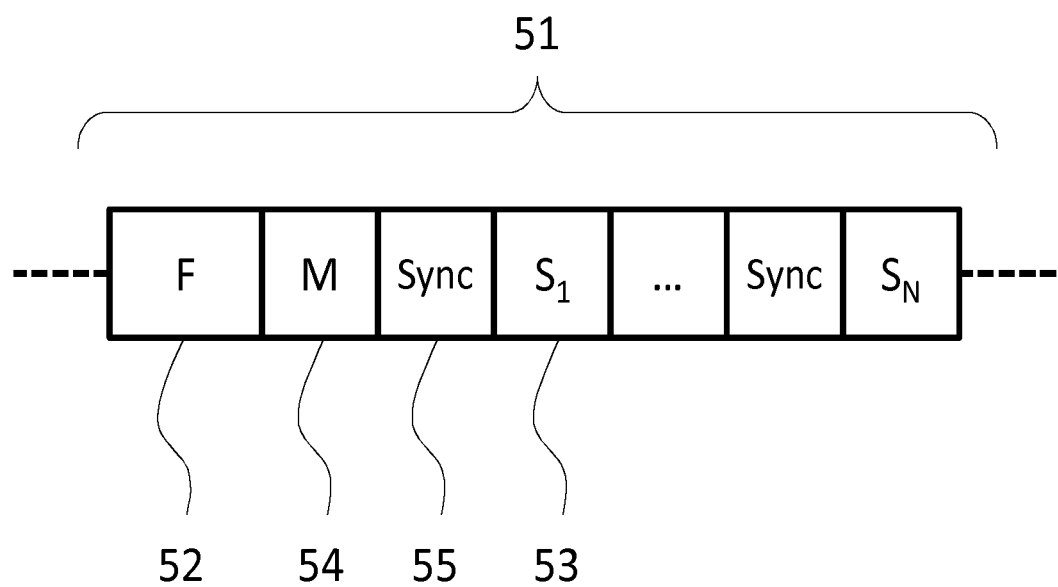
FIG. 7 illustrates a communication frame comprising a measurement slot and synchronization time slots.

FIG. 7 illustrates a communication frame in which the communication time slots $S_1$-$S_N$ are each preceded by a synchronization time slot 55 in which the transmitter send a message or a fixed bit pattern. This may for example enable the power transmitter to communicate more timely in regard to the preceding or subsequent time slot. In this way the power transmitter more rigidly controls and coordinates the timing of the communication. This enables better synchronization between the power transmitter and the power receivers.

For compatibility reasons, the duration of the power measurement time slot M, the communication time slots $S_1$-$S_N$ and the synchronization time slots may be chosen in a range of 30 to 60 milliseconds. This has the advantage to make the communication approach compatible with the existing Qi wireless power specification in which a 'digital ping window' duration of 65 msec is specified. A power measurement time slot duration of 30 to 60 msec, for example of 50 msec, works well. The duration must be long enough to perform a good measurement, yet sufficiently below the limit of 65 msec. Staying sufficiently within the 65 msec ensures that a power transmitter running the above communication protocol with synchronised power measurement time slots can also detect and correctly operate with a power receiver that is only compatible with the already existing specification. Also, a power receiver can thus always detect power transmitter communication within the time-out of 65 msec, and establish what version of the specified communication is being used by the power transmitter.

Figure 8:
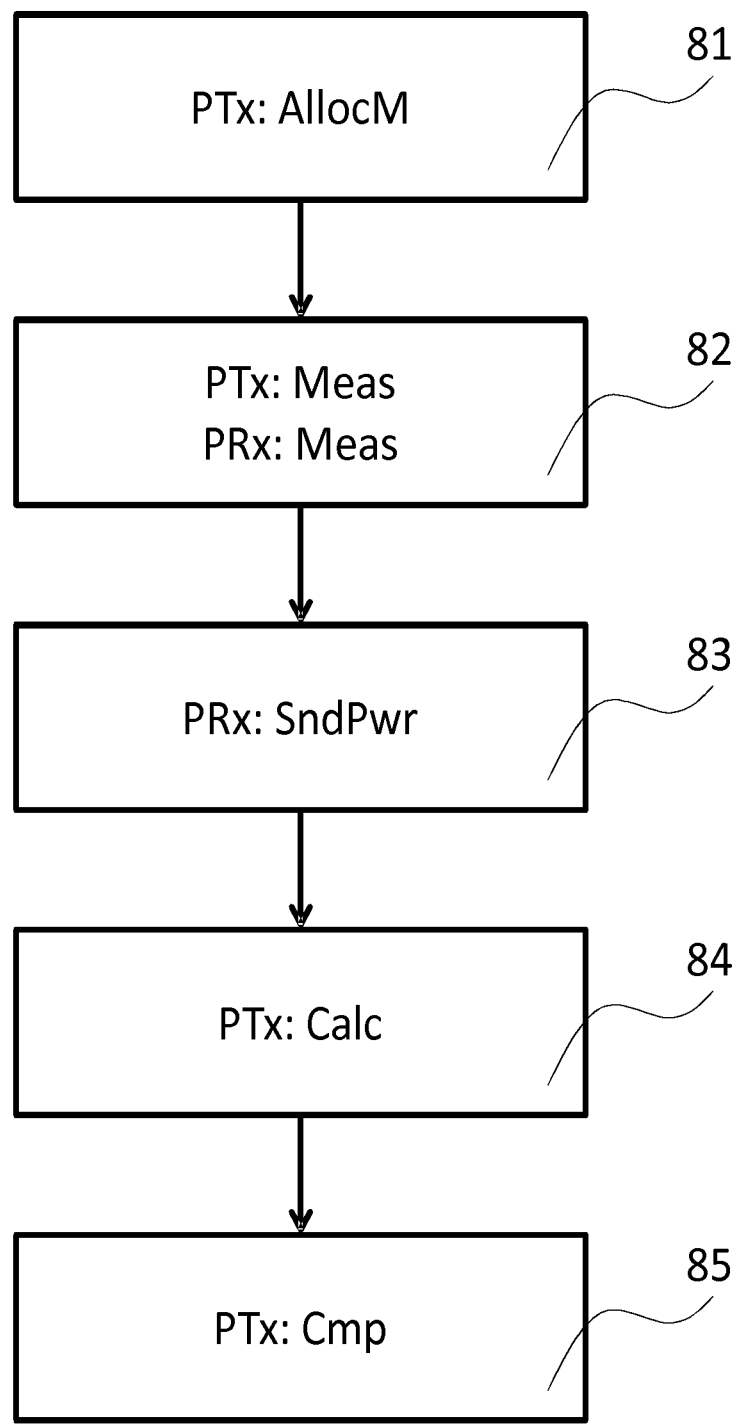
FIG. 8 illustrates a method of determining power loss.

FIG. 8 illustrates a typical method of determining power loss for the detection of foreign objects in an inductive wireless power transfer system comprising an inductive wireless power transmitter 22 and at least two inductive wireless power receivers 23. The communication between transmitter and receivers is organized in frames and time slots and coordinated by the power transmitter, as described above.

In a first step 81, the power transmitter allocates a power measurement time slot, and announces the time slot to the power receivers by sending a message.

In a next step 82, both the power transmitter and the power receivers perform power measurements during the allocated power measurement time slot. The power transmitter measures the wireless inductive power it has transmitted, and the power receivers each measure the inductive wireless power they have received. These measurements may be corrected for known deviations, caused for example by metallic parts of the transmitter and receivers themselves, by dissipation or other imperfections in the electric circuitry, etcetera. In a next step 83, each power receiver sends the result of its power measurement to the power transmitter. This will happen sequentially, i.e. each receiver will communicate its measurement results in its own communication time slot.

In a next step 84, the power transmitter calculates a power loss based on the difference between the power transmitted by the power transmitter and the sum of the power received by each of the power receivers.

In a further step 85, the transmitter compares the calculated power loss to a threshold value. If the threshold is exceeded the power may be reduced, or even completely interrupted, or an alarm may be triggered to inform a user of the suspected presence of a foreign object.

While the invention has been illustrated and described in detail in the drawings and foregoing description, such illustration and description are to be considered illustrative or exemplary and not restrictive; the invention is not limited to the disclosed embodiments.

The mere fact that certain measures are recited in mutually different dependent claims does not indicate that a combination of these measures cannot be used to advantage. In fact many features may be combined which a skilled person will recognize as mutually compatible, such as the different time slotting options discussed, the different modulation methods, different power levels, or timing aspects as mentioned throughout the text.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. Any reference signs in the claims should not be construed as limiting the scope.

The invention claimed is:

1. An inductive wireless power transmitter comprising
a primary coil, wherein the primary coil transmits the inductive wireless power signal,
a power converter, wherein the power converter provides power to the primary coil,
a power measurement circuit, wherein the power measurement circuit determines an amount of inductive wireless power transmitted by the power transmitter,
a power modulation and demodulation circuit, wherein the power modulation and demodulation circuit modulates and demodulates the inductive wireless power signal, and
a communication coordination and control circuit,
wherein the communication coordination and control circuit controls the power modulation and demodulation unit to coordinate communication with the at least two inductive wireless power receivers in time slots present in repeating communication frames,
wherein the communication coordination and control circuit allocates a different time slot to each inductive wireless power receiver for transmissions to the communication coordination and control circuit,
wherein the communication coordination and control circuit allocates a power measurement time slot for synchronised power measurements,
wherein the communication coordination and control circuit announces the power measurement time slot to the wireless power receivers,
wherein the communication coordination and control circuit activates the power measurement unit to determine the amount of inductive power transmitted by the power transmitter during the power measurement time slot,
wherein the communication coordination and control circuit receives a message from each of the wireless power receivers at each allocated time slot after the power measurement time slot,
wherein the message indicates an amount of inductive power received by that power receiver during the power measurement time slot, and
wherein the communication coordination and control circuit calculates an amount of power lost from the determined amount of power transmitted and the amounts of power received;
wherein the inductive wireless power transmitter reduces the power of the inductive wireless power signal if the calculated amount of power lost exceeds a threshold value.

2. The inductive wireless power transmitter of claim 1, wherein the duration of the power measurement time slot is in the range of 30 to 60 milliseconds.

3. An inductive wireless power receiver comprising:
a secondary coil, wherein the secondary coil is arranged to receive the inductive wireless power signal,
a power modulation and demodulation circuit, wherein the power modulation and demodulation circuit modulates and demodulates the inductive wireless power signal,
a power measurement circuit, wherein the power measurement circuit determines the amount of inductive wireless power received by the power receiver,
and a communication and control unit,
wherein the communication and control circuit controls the power modulation and demodulation unit to communicate with the inductive wireless power transmitter, in an allocated time slot of a plurality of communication time slots present in repeating communication frames,
wherein the communication time slots are allocated and coordinated by the inductive wireless power transmitter,
wherein the communication and control circuit receives from the inductive wireless power transmitter an announcement of an allocated power measurement time slot for synchronised power measurements,
wherein the communication and control circuit activates the power measurement unit to determine an amount of inductive power received from the power transmitter during the power measurement time slot,
wherein the communication and control circuit sends to the wireless power transmitter a message indicating the amount of inductive power received in the allocated time slot after the power measurement time slot,
wherein the wireless power transmitter detects foreign objects based on a calculated amount of power lost in the wireless power transfer system based on a cumulative amount of inductive power received from the inductive wireless power receiver and the at least one further inductive wireless power receiver.

4. The inductive wireless power receiver of claim 3, wherein the duration of the power measurement time slot is in the range of 30 to 60 milliseconds.

5. A method of detecting foreign objects by determining a power loss in an inductive wireless power transfer system comprising an inductive wireless power transmitter for transmitting an inductive wireless power signal and at least two inductive wireless power receivers for receiving the inductive wireless power signal,
wherein the power transmitter and the power receivers are arranged to communicate using modulation and demodulation of the inductive wireless power signal,
where the communication is proportioned in a plurality of time slots and coordinated by the power transmitter,
the method comprising:
allocating, by the power transmitter, a different time slot to each of the at least two inductive wireless power receivers for sending messages to the power transmitter,
allocating, by the power transmitter, a synchronised power measurement time slot and sending a message to the power receivers announcing the synchronised power measurement time slot,
measuring, by the power transmitter, during the power measurement time slot, the inductive wireless power transmitted by the power transmitter,
measuring, by each of the power receivers, during the power measurement time slot, an inductive wireless power received by that power receiver,
sending, by each of the power receivers, in each allocated time slot after the power measurement time slot, a message to the power transmitter indicating the measured power received by that power receiver,
calculating, by the power transmitter, the power loss from the measured inductive wireless power transmitted by the power transmitter and the measured inductive wireless powers received by each of the power receivers,
reducing, by the power transmitter, the power of the inductive wireless power signal if the calculated power loss exceeds a threshold value.

6. The method according to of claim 5, wherein the duration of the power measurement time slot is in the range of 30 to 60 milliseconds.

7. A method of detecting foreign objects by determining a power loss in an inductive wireless power transmitter for transmitting an inductive wireless power signal to at least two inductive wireless power receivers for receiving the inductive wireless power signal,
wherein the power transmitter is arranged to communicate with the power receivers using modulation and demodulation of the inductive wireless power signal,
wherein the communication is proportioned in time slots and coordinated by the power transmitter,
the method comprising allocating, by the power transmitter, a different time slot to each of the at least two inductive wireless power receivers for sending messages to the power transmitter,
allocating, by the power transmitter, a synchronised power measurement time slot and sending a message to the power receivers announcing the synchronised power measurement time slot,
measuring, by the power transmitter, during the power measurement time slot, the inductive wireless power transmitted by the power transmitter,
receiving, by the power transmitter, from each of the power receivers, in each allocated time slot after the power measurement time slot, a message indicating the measured power received by that power receiver,
calculating, by the power transmitter, the power loss from the measured inductive wireless power transmitted by the power transmitter and the measured inductive wireless powers received by each of the power receivers,
reducing, by the power transmitter, the power of the inductive wireless power signal if the calculated power loss exceeds a threshold value.

8. The method of claim 7, wherein the duration of the power measurement time slot is in the range of 30 to 60 milliseconds.

* * * * *